(12) United States Patent
Hedlund et al.

(10) Patent No.: US 10,590,833 B2
(45) Date of Patent: Mar. 17, 2020

(54) COOLING JACKET FOR EXHAUST VALVE AND THERMOSTAT AND COOLING BOTTLE

(71) Applicant: POLARIS INDUSTRIES INC., Medina, MN (US)

(72) Inventors: Darren J. Hedlund, Roseau, MN (US); Oliver J. Young, Birmingham (GB)

(73) Assignee: Polaris Industries Inc., Medina, MN (US)

( * ) Notice: Subject to any disclaimer, the term of this patent is extended or adjusted under 35 U.S.C. 154(b) by 140 days.

(21) Appl. No.: 15/723,909

(22) Filed: Oct. 3, 2017

(65) Prior Publication Data

US 2019/0101223 A1 Apr. 4, 2019

(51) Int. Cl.
| | | |
|---|---|---|
| *F01P 11/02* | (2006.01) | |
| *F01P 7/16* | (2006.01) | |
| *F01P 3/02* | (2006.01) | |
| *F01P 9/00* | (2006.01) | |
| *F16K 31/00* | (2006.01) | |
| *F01P 11/04* | (2006.01) | |
| *F01P 11/16* | (2006.01) | |

(52) U.S. Cl.
CPC ............... *F01P 11/029* (2013.01); *F01P 3/02* (2013.01); *F01P 7/16* (2013.01); *F01P 9/00* (2013.01); *F16K 31/002* (2013.01); *F01P 11/04* (2013.01); *F01P 11/16* (2013.01); *F01P 2009/005* (2013.01); *F01P 2050/16* (2013.01)

(58) Field of Classification Search
CPC .. F16K 31/002; F01P 3/14; F01P 11/04; F01P 3/02; F01P 7/16; F01P 11/029; F01P 11/0204; F01P 2003/028
See application file for complete search history.

(56) References Cited

U.S. PATENT DOCUMENTS

| | | | | |
|---|---|---|---|---|
| 2001/0023669 A1* | 9/2001 | Buysse | ...................... | F01P 3/20 |
| | | | | 123/41.55 |
| 2011/0197832 A1* | 8/2011 | Berkemeier | ............ | F02F 1/243 |
| | | | | 123/41.44 |

* cited by examiner

*Primary Examiner* — Jacob M Amick
(74) *Attorney, Agent, or Firm* — Harness Dickey (57) ABSTRACT

A coolant bottle defines a first chamber and a second chamber fluidly coupled to the first chamber at a valve seat. The first chamber is fluidly coupled to a source of heated engine cooling fluid, while the second chamber is fluidly coupled to an engine water pump. A thermally responsive actuator is disposed within the first chamber, and has a thermally actuated sliding member having a valve seat engaging surface. The thermally actuated sliding member is movable from a first open position to a second closed position when the coolant is above a first temperature. The thermally responsive actuator is disposed within the first chamber.

20 Claims, 14 Drawing Sheets

COOLING JACKET FOR EXHAUST VALVE AND THERMOSTAT AND COOLING BOTTLE

FIELD

The present disclosure relates to a vehicle and, more particularly, to an apparatus and method for cooling an engine of a vehicle.

BACKGROUND

This section provides background information related to the present disclosure which is not necessarily prior art.

Vehicles such as snowmobiles utilize two stroke engines which are run at high RPM. These two stroke engines produce a significant amount of heat which builds up in the head, cylinder and exhaust ports of the engine structure that needs to be removed from the engine. Traditionally, these two cycle engines use cooling fluid that utilizes a bypass check valve incorporated into the engine crank case to direct the cooling fluid to different heat exchange structures as is needed depending on the temperature of the cooling fluid.

These two stroke engines also produce a significant amount vibration in addition to the extreme temperatures which significantly reduce the life of components such as the engine's fuel system including injectors, the pistons, intake manifolds, and exhaust systems, a cooling system bypass check valve. It is an intention of the present teachings to improve heat management within an engine to improve the life expectancy of engine components.

SUMMARY

This section provides a general summary of the disclosure, and is not a comprehensive disclosure of its full scope or all of its features. The present disclosure teaches an improved system and method for reliably managing two cycle engine heat, and particularly two cycle engine heat snowmobile. The system moves the cooling system bypass check valve out of the engine and into a location in a cooling system which is subjected to significantly lower vibrational energy.

According to the present teachings, presented is coolant reservoir configured to be placed within a vehicle cooling system. The coolant reservoir has a bottle that defines a first chamber and a second chamber fluidly coupled to the first chamber through an aperture having a valve seat. The first chamber is fluidly coupled to a source of heated engine cooling fluid, while the second chamber is fluidly coupled to an engine water pump. A thermally responsive actuator having a sliding member and a valve seat engaging surface is disposed within the first chamber. The sliding member is movable from a first open position to a second closed position when the coolant is above a first temperature.

According to the afore mentioned paragraph and the following paragraphs, a first spring can be engaged between the sliding member and the coolant bottle and is operative to urge the sliding member in a first direction relative to the valve seat. A second spring can be engaged between the sliding member and the coolant bottle and operative to urge the valve seal in a second direction relative to the valve seat.

According to the afore mentioned paragraphs and the following paragraphs, the coolant reservoir can have a first member defining a first portion of the first chamber and a first portion of the second chamber.

According to the afore mentioned paragraphs and the following paragraphs, the coolant reservoir can have a second member defining a second portion of the first chamber, and wherein the thermally responsive actuator has a flange member couple to the second member.

According to the afore mentioned paragraphs and the following paragraphs, the coolant reservoir can have a first member defines a first portion of the first chamber and a first portion of the second chamber.

According to the afore mentioned paragraphs and the following paragraphs, the coolant reservoir can have a first member defining a first chamber first aperture fluidly coupled to the engine water pump.

According to the afore mentioned paragraphs and the following paragraphs, the coolant reservoir can have a first member defining a first chamber first aperture fluidly coupled to the source of heated engine cooling fluid.

According to the afore mentioned paragraphs and the following paragraphs, the coolant reservoir can have first member defining a bypass aperture between the first and second chambers having the valve seat, whereby the valve seat engaging surface is positioned adjacent the bypass aperture.

According to the afore mentioned paragraphs and the following paragraphs, the coolant reservoir can have the thermally responsive actuator axially coupled to the bottle.

According to the afore mentioned paragraphs and the following paragraphs, the coolant reservoir first member defines a first chamber second aperture fluidly coupled to a cooling chamber.

According to the afore mentioned paragraphs and the second member defines a first chamber second aperture fluidly coupled to the cooling chamber.

According to the present teachings, and the previously mentioned and following paragraphs, presented is coolant reservoir configured to be placed within a vehicle cooling system. A coolant bottle formed of at least first and second members. The first and second members define a first chamber, and the first member further forms a portion of a second chamber. The first and second chambers are fluidly coupled through an aperture having a valve seat. The first chamber is fluidly coupled to a source of heated engine cooling fluid, and the second chamber is fluidly coupled to an engine water pump. The bottle has a thermally responsive actuator disposed within the first chamber that has a sliding member having a valve seat engaging surface. The sliding member is movable from a first open position when the coolant is below a first temperature to a second position when the coolant is above the a first temperature.

According to the present teachings, and the previously mentioned and following paragraphs wherein the first member defines a second chamber first aperture fluidly coupled to the engine water pump.

According to the present teachings, and the previously mentioned and following paragraphs wherein the first member further defines a second chamber first aperture fluidly coupled to the source of heated engine cooling fluid.

According to the present teachings, and the previously mentioned and following paragraphs wherein the first member defines a second chamber second aperture fluidly coupled to a heat exchange chamber.

According to the present teachings, and the previously mentioned and following paragraphs wherein the second member defines a first chamber second aperture fluidly coupled to the heat exchange chamber.

According to the present teachings, and the previously mentioned and following paragraphs further comprising a third member defining a closable third coolant accepting aperture.

According to the present teachings, and the previously mentioned and following paragraphs further having a conical swirl plate member disposed between the third chamber and second chamber, the conical swirl plate member defines a plurality of coupling apertures fluidly coupling the second and third chambers.

According to the present teachings, and the previously mentioned and following paragraphs where the sliding valve element has a second exterior bearing surface which is configured to engage a first end of the second intermediate spring.

According to the present teachings, and the previously mentioned and following paragraphs wherein the sliding valve element bearing surface slidably supports the valve seal and regulates the movement of the valve seal toward and away from the valve seat.

According to the present teachings, and the previously mentioned and following paragraphs wherein the thermally responsive actuator includes a retractable piston, the thermally responsive actuator is configured to retract the piston and thereby position the sliding valve element in an open position.

According to the present teachings, and the previously mentioned and following paragraphs where the thermally responsive actuator includes a retractable piston, the thermally responsive actuator is configured to retract the piston and thereby position a valve seal stop on the sliding valve element in an open position.

According to the present teachings, and the previously mentioned and following paragraphs, presented is coolant reservoir configured to be placed within a vehicle cooling system. The coolant reservoir has a first member defining first and second chambers and a first bypass passage having a first valve seat there between. The first chamber is fluidly coupled to a heated engine fluid supply and the second chamber is fluidly coupled to an engine fluid return. The bottle includes a thermally responsive actuator that moves a valve bearing element between an open and closed positions. The thermally responsive actuator includes a sliding valve element disposed within the first chamber and a valve seal which is configured to engage the first valve seat. The sliding valve element has a second exterior bearing surface which is configured to fixably engage the first member. The thermally responsive actuator is operably engaged between the sliding valve element and the bottle and operative to urge the sliding valve element away the valve seat and wherein the second spring is engaged between the sliding valve element and the valve seal and operative to urge the valve seal toward the valve seat.

According to the present teachings, and the previously mentioned and following paragraphs where the first member defines a second chamber first aperture fluidly coupled to the engine water pump.

According to the present teachings, and the previously mentioned and following paragraphs where the first member further defines a second chamber first aperture fluidly coupled to the source of heated engine cooling fluid.

According to the present teachings, and the previously mentioned and following paragraphs where the first member defines a second chamber second aperture fluidly coupled to a heat exchange chamber.

According to the present teachings, and the previously mentioned and following paragraphs where the second member defines a first chamber second aperture fluidly coupled to the heat exchange chamber.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Although the following description includes several examples of a snowmobile application, it is understood that the features herein may be applied to any appropriate vehicle, such as, all-terrain vehicles, utility vehicles, moped and scooters. The examples disclosed below are not intended to be exhaustive to limit the disclosure the precise forms disclosed in the following detailed description. Rather, the examples are chosen and described so that others skilled in the art may utilize their teachings.

Figure 1:
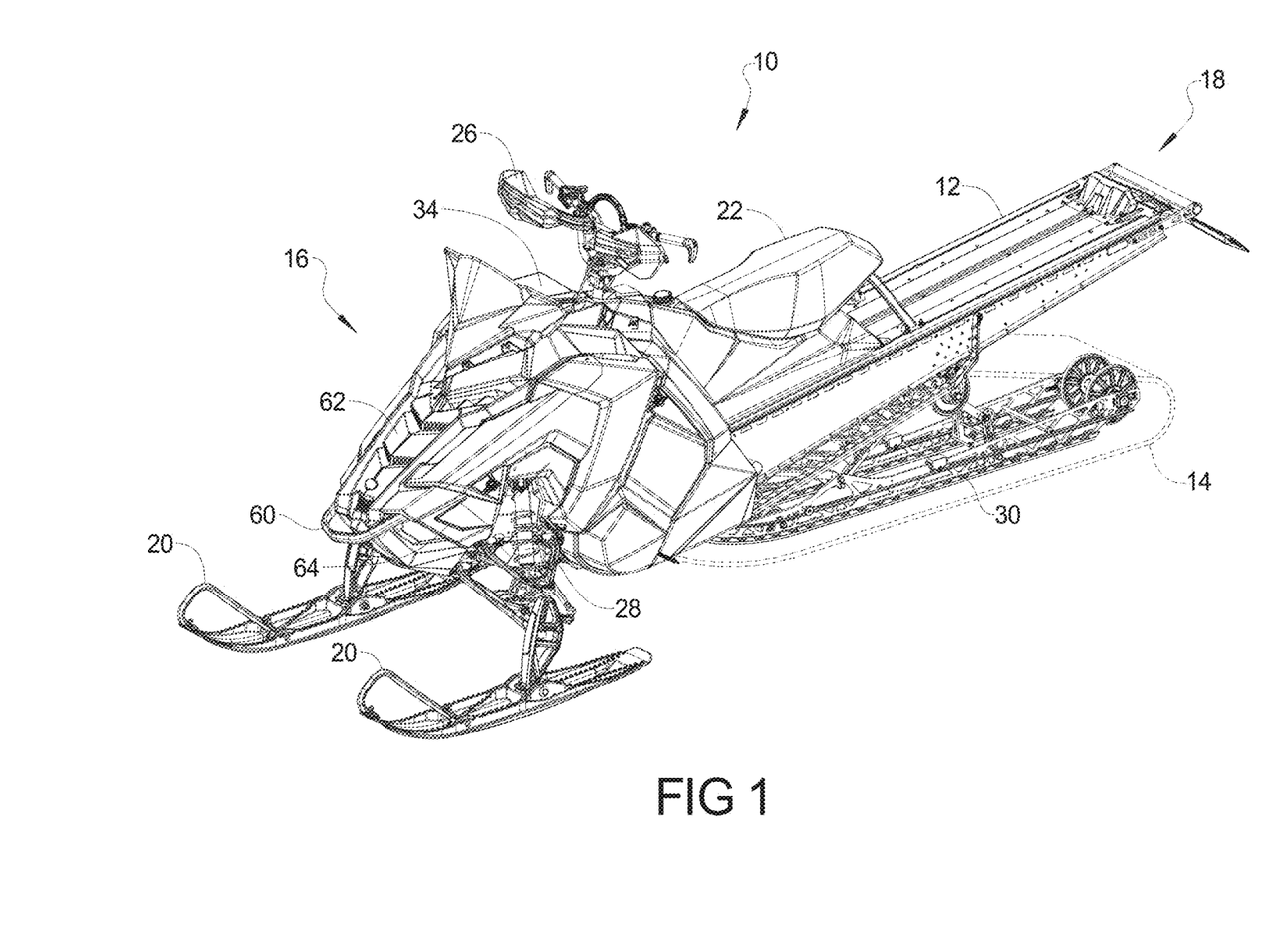
FIG. 1 is a perspective view of a snowmobile.
Figure 2A:
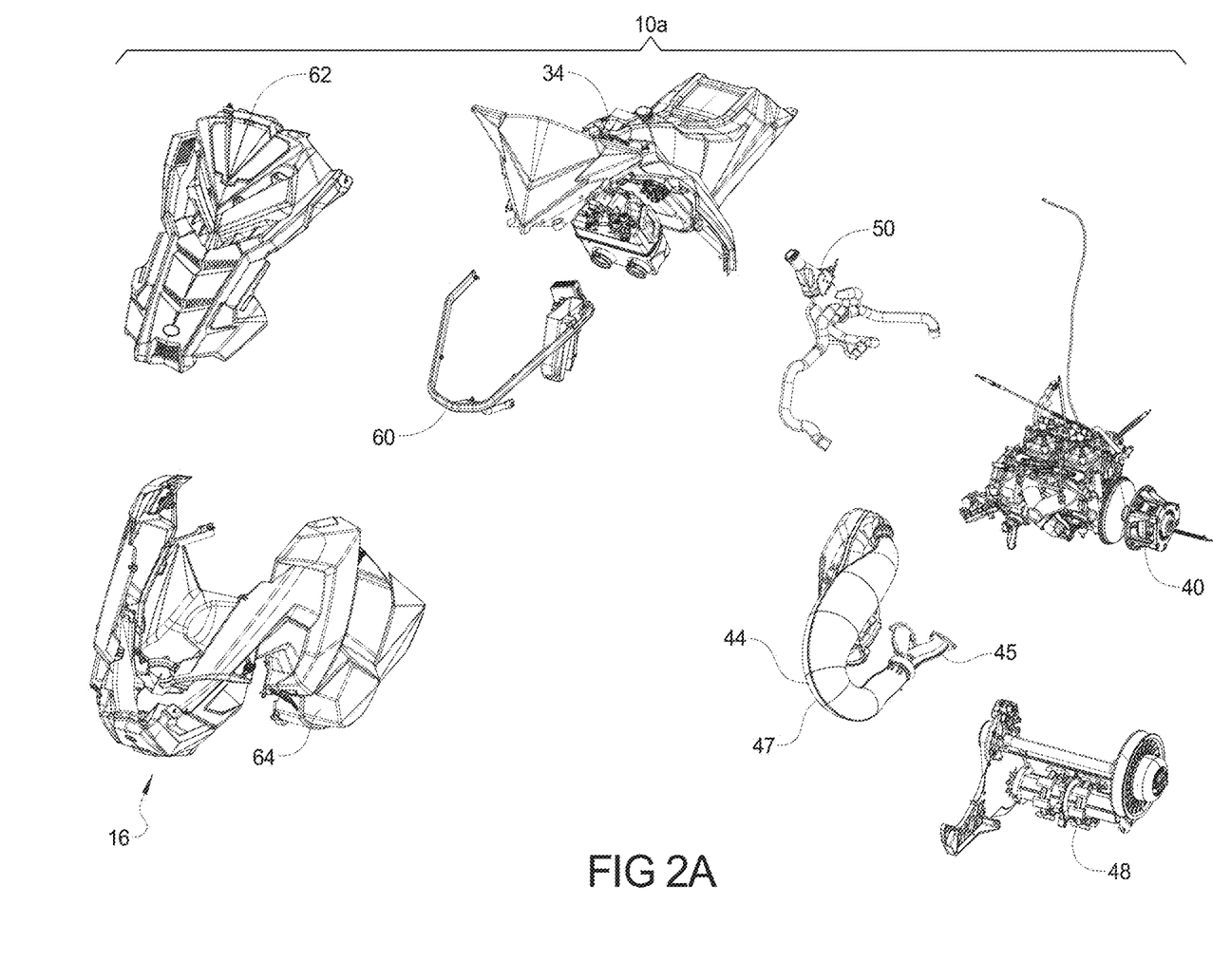
FIGS. 2A and 2B are exploded views of the snowmobile of FIG. 1.
Figure 2B:
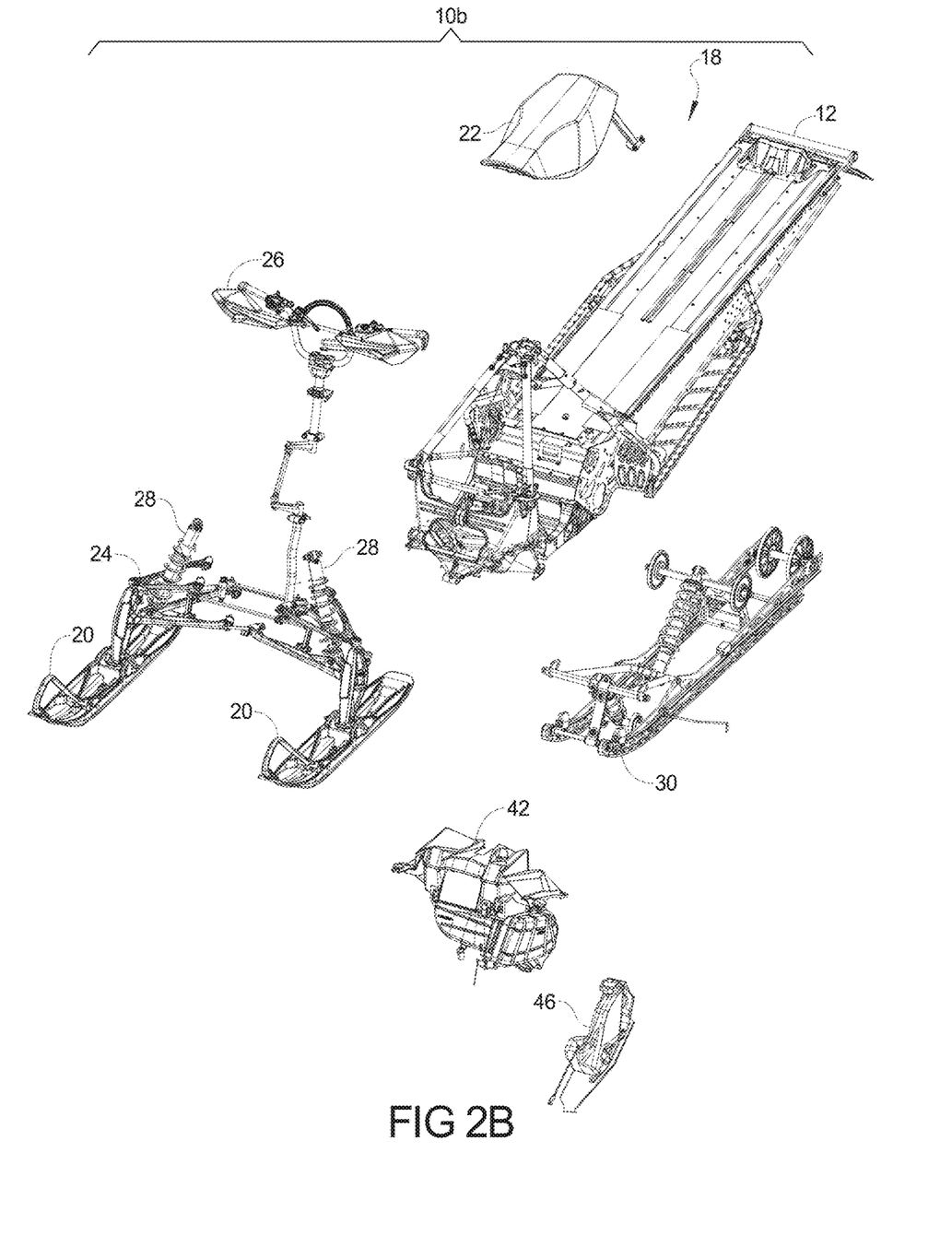

Referring now to FIGS. 1-2B, one embodiment of an exemplary snowmobile 10 is shown. Snowmobile 10 includes a chassis 12, an endless belt assembly 14, and a pair of front skis 20. Snowmobile 10 also includes a front-end 16 and a rear-end 18.

The snowmobile 10 also includes a seat assembly 22 that is coupled to the chassis assembly 12. A front suspension assembly 24 is also coupled to the chassis assembly 12. The front suspension assembly 24 may include a steering wheel 26, shock absorbers 28 and the skis 20. A rear suspension assembly 30 is also coupled to the chassis assembly 12. The rear suspension assembly 30 may be used to support the endless belt 14 for propelling the vehicle. An electrical console assembly 34 is also coupled to the chassis assembly 12. The electrical console assembly 34 may include various components for electrically controlling the snowmobile 10.

The snowmobile 10 also includes an engine assembly 40. The engine assembly 40 is coupled to an intake assembly 42 and an exhaust assembly 44. The intake assembly 42 is used for providing fuel and air into the engine assembly 40 for the combustion process. Exhaust gas leaves the engine assembly 40 through the exhaust assembly 44. An oil tank assembly 46 is used for providing oil to the engine for lubrication and for mixing with the fuel in the intake assembly 42. A drivetrain assembly 48 is used for converting the rotating crankshaft assembly from the engine assembly 40 into a force to use the endless belt 14 and thus the snowmobile 10. The engine assembly 40 is also coupled to a cooling assembly 50.

The chassis assembly 12 may also include a bumper assembly 60, a hood assembly 62 and a nose pan assembly 64. The hood assembly 62 is movable to allow access to the engine assembly 40 and its associated components.

Figure 3A:
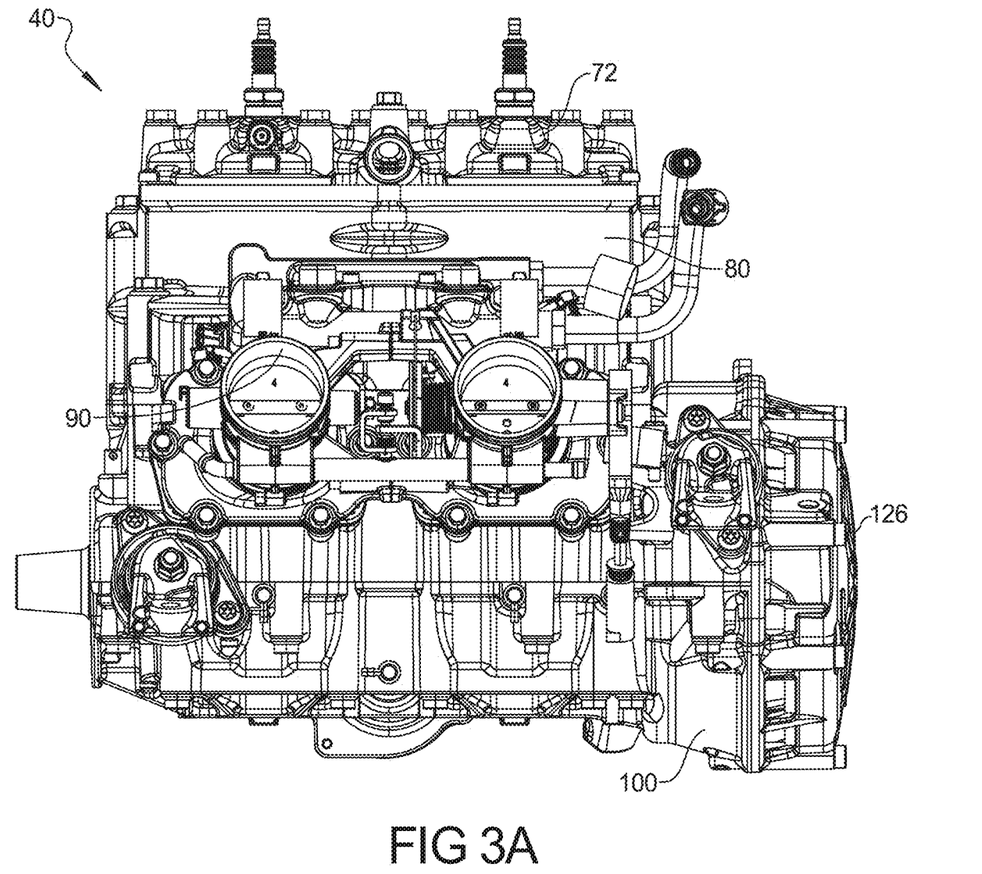
FIGS. 3A and 3B are opposite side views of the engine of FIG. 2.
Figure 3B:
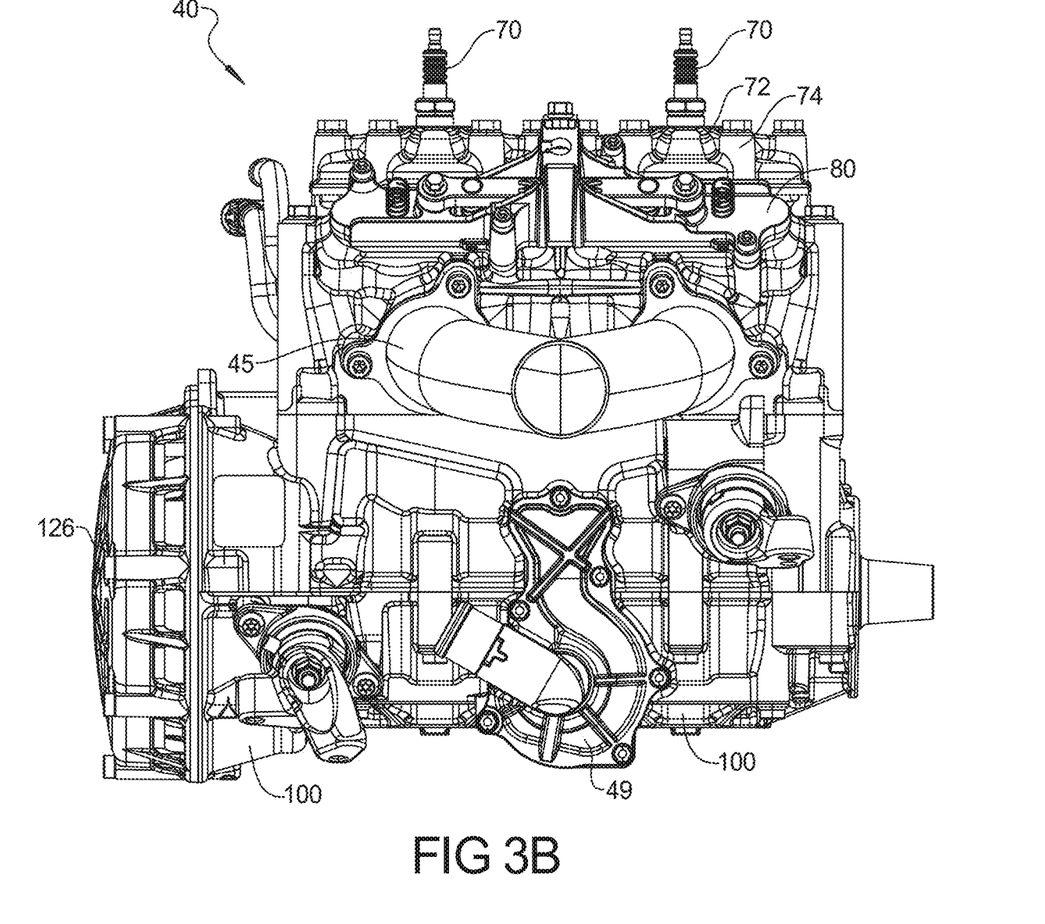
Figure 4:
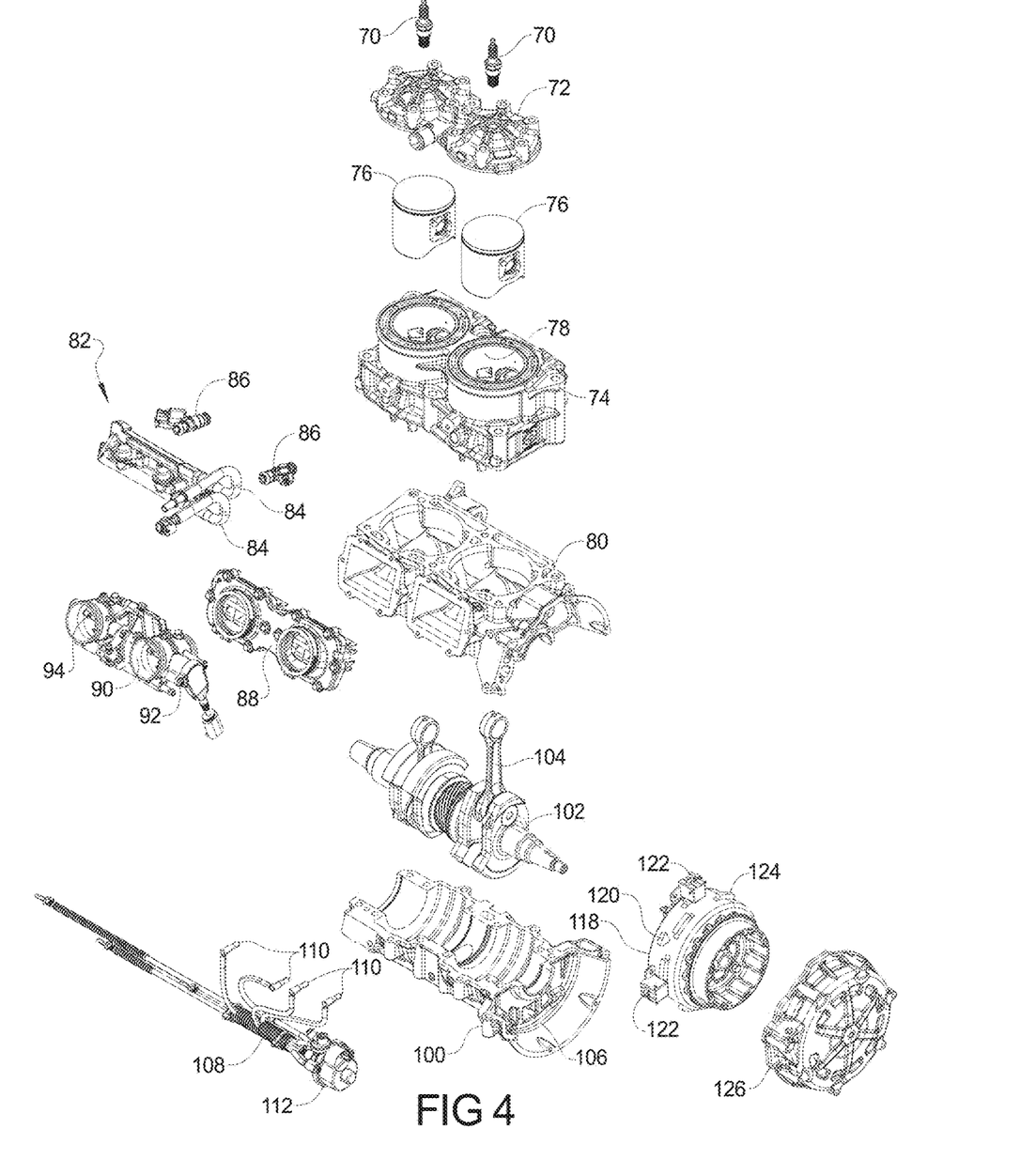
FIG. 4 is an exploded view of the engine of FIG. 3.

Referring now to FIGS. 3A, 3B and 4, the engine assembly 40 is illustrated in further detail. The engine assembly 40 is a two-stroke engine that includes the exhaust assembly 44 which may be referred to as an exhaust manifold.

The engine assembly 40 may include spark plugs 70 which are coupled to a cylinder head cover 72. The cylinder head cover 72 is coupled to the cylinder head 74 which is used for housing the pistons 76 to form a combustion chamber 78 therein. The cylinder head 74 is mounted to the engine block 80.

The fuel system 82 includes fuel lines 84 and fuel injectors 86. The fuel lines 84 provide fuel to the fuel injectors 86 which inject fuel, in this case, into a port adjacent to the pistons 76. An intake manifold 88 is coupled to the engine block 80. The intake manifold 88 is in fluidic communication with the throttle body 90. Air is air for the combustion processes admitted into the engine through the throttle body 90 which may be controlled directly through the use of an accelerator pedal or hand operated switch. A throttle position sensor 92 is coupled to the throttle to provide a throttle position signal corresponding to the position of a throttle valve of throttle plate 94 to an engine controller.

The engine block 80 is coupled to crankcase 100 and forms a cavity for housing the crankshaft 102. The crankshaft 102 has connecting rods 104 which are ultimately coupled to the pistons 76. The movement of the pistons 76 within the engine chamber 78 causes a rotational movement at the crankshaft 102 by way of the connecting rods 104. The crankcase may have openings or vents 106 therethrough. The system is lubricated using oil lines 108 which are coupled to the oil injectors 110 and an oil pump 112.

The crankshaft 102 is coupled to the flywheel 118 and having a stator 120 therein. The flywheel 118 has crankshaft position sensors 122 that aid in determining the positioning of the crankshaft 102. The crankshaft position sensors 122 are aligned with the teeth 124 and are used when starting the engine as well as being used to time the operation of the injection of fuel during the combustion process. A stator cover 126 covers the stator 120 and flywheel 118.

Figure 5:
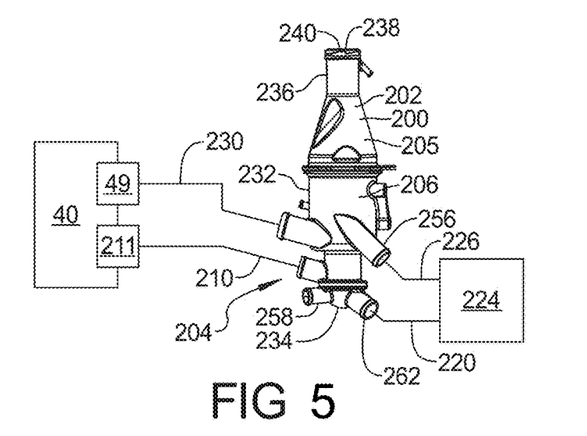
FIG. 5 is a block diagrammatic view of a cooling system for a vehicle.

FIG. 5 is a block diagrammatic view of a cooling system for a vehicle. As described further below, the engine assembly 40 is water cooled, having a water pump 49 configured to push coolant fluid into the engine block 80 and through the engine assembly 40. The heated coolant fluid leaves a source of heated engine cooling fluid 211 in the engine assembly 40, which in this case originates from the cylinder head 74 of the engine assembly 40, and travels to a coolant reservoir 200. The coolant reservoir 200 has a bottle 202 configured to be placed within the vehicle cooling system. The bottle 202 defines first and second chambers 204 and 206 which are fluidly coupled together through an aperture 207. Defined about the aperture 207 is a valve seat 208. The first chamber 204 is fluidly coupled to the source of heated engine cooling fluid 211, while the second chamber 206 is fluidly coupled to the engine water pump 49 which returns the coolant fluid back to the engine assembly 40.

Upon exposure to heated fluid from the source of heated engine cooling fluid 211, a thermally responsive actuator 212 closes the aperture 207 between the first and second chambers 204 and 206, inducing the heated fluid from the engine assembly 40 to pass from the first chamber 204, through a first chamber exit port 222 to a heat exchange chamber 262. The heat exchanger 262 is configured to be cooled by moving snow that removes heat from the cooling fluid. This heat reduced cooling fluid is then returned to the second chamber 206 through an inlet port 226 where bubbles are allowed to escape into the third chamber 205. The fluid is then transferred from the second chamber 206 through a second chamber exit port 228 to a hose 230 coupled to the water pump 49.

Figure 6:
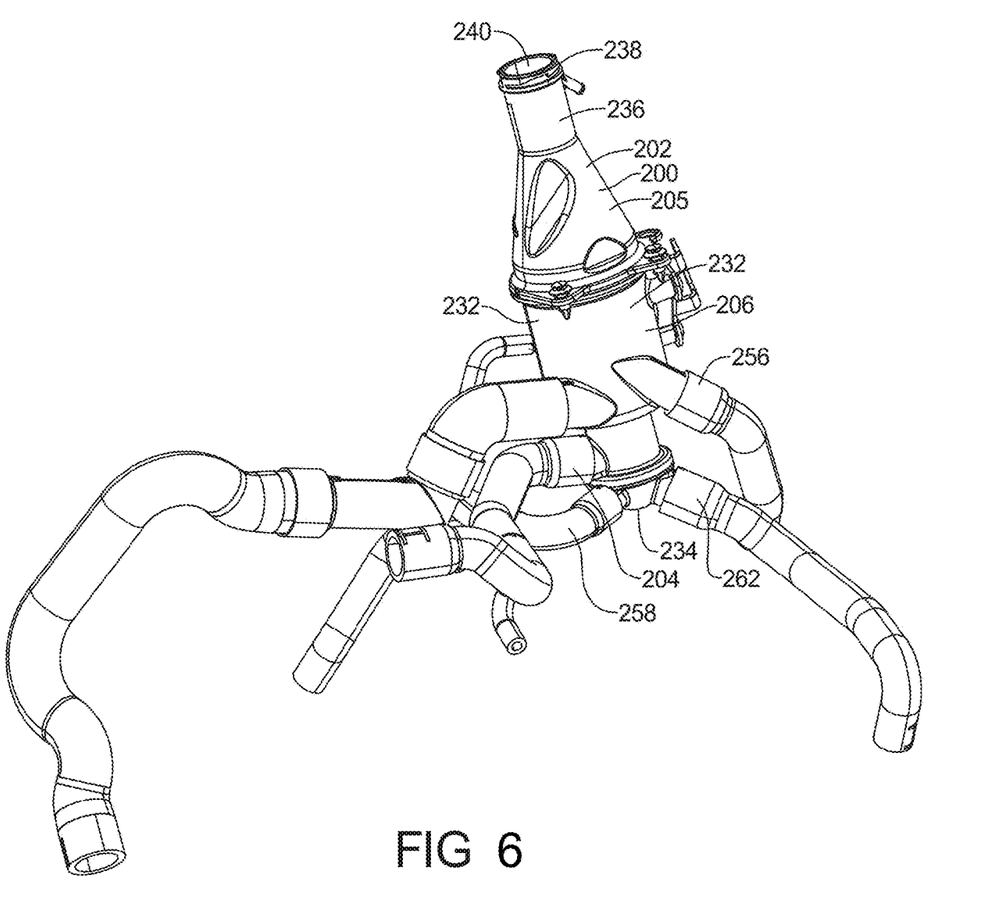
FIG. 6 is a view of a coolant reservoir bottle configured to be placed within a vehicle cooling system in FIG. 5.

FIG. 6 is an exterior view of the bottle 202 within the vehicle cooling system shown in FIG. 5 with an interior valve element (not shown). The bottle 202 is formed of first, second, and third exterior members (232, 234, 236) which define the first, second and third chambers 204, 206, 205. The first and second members 232 and 234 define the first chamber 204, and the first member 232 further forms a portion of a second chamber 206. The third chamber 205 which is fluidly coupled to the second chamber 234 is formed of the third funnel shaped exterior member 236, which has a closable filling port 242 that allows the filling of the cooling system with coolant as needed. The first chamber 204 is fluidly coupled to the source of heated engine cooling fluid 211, and the second chamber is fluidly coupled to the engine water pump 49 as described above.

Figure 7A:
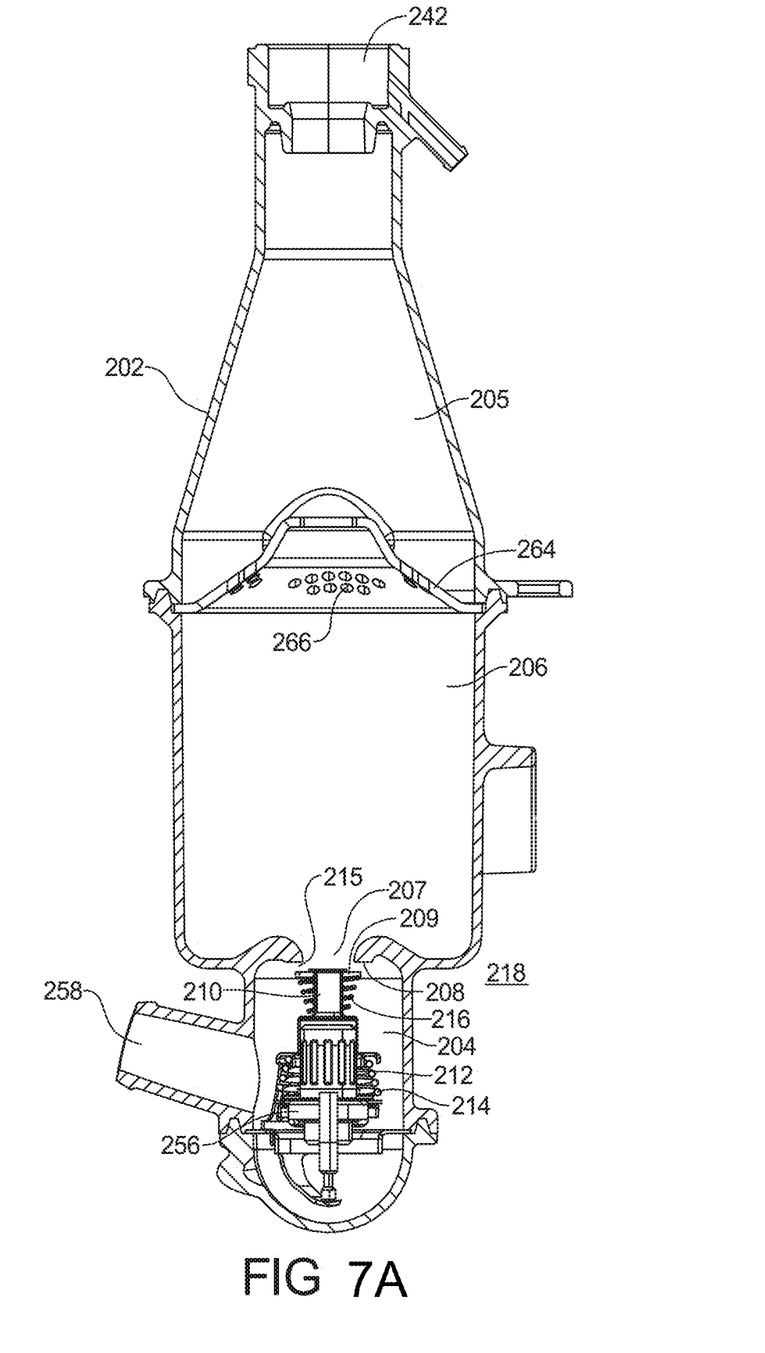
FIGS. 7A and 7B are cross sectional views of a coolant reservoir configured to be placed within the vehicle cooling system shown in FIG. 5 with a valve elements in opened and closed positions respectfully.
Figure 7B:
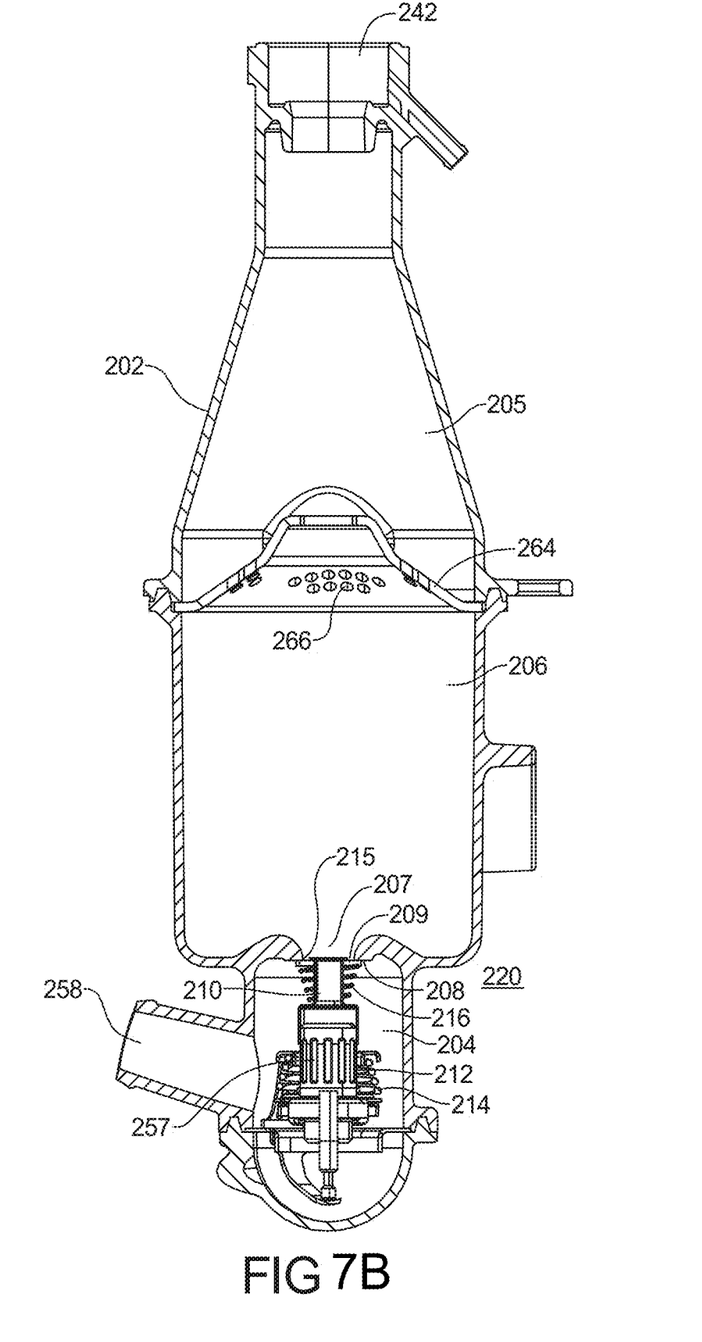

As shown in FIGS. 7A and 7B, the bottle 202 has a thermally responsive actuator 212 disposed within the first chamber 204, and configured to move a thermally actuated sliding valve element 210 having the valve seat engaging surface or seal 208. The thermally actuated sliding member 210 is movable from a first open position where the valve seal 209 engages the valve seat 208 that is displaced from the valve seat 208 to a second position when the coolant is below a first temperature.

As shown in FIG. 7A, when functioning, such as during vehicle startup, the thermally responsive actuator 212 is in an open position within the first chamber 204. Fluid from the heated engine fluid supply 211 flows in to the first chamber 204, past the thermally responsive actuator 212, and valve seat 208 through the aperture 207 and into the second chamber 206. The fluid then is returned directly to the water pump 49. The sliding valve element 210 has a second exterior bearing flange 252 which is configured to engage the first member 232 to fixably couple the element to the bottle 202. At temperatures below a first predetermined temperature cooling fluid is allowed to circulate directly into the engine at startup.

FIG. 7B is a cross sectional view of the bottle 202 with the thermally responsive actuator 212 in a closed position. When subjected to heated engine fluid, the thermally responsive actuator 212 thermal element 256 expands and thus translates the sliding valve element 210 and associated seal member 209 into engagement with the valve seat 208. This closes the aperture 207 between the first and second chambers 204 and 206 which directs the heated fluid through the heat exchange chamber 262.

The bottle 202 first member 232 defines the first chamber first aperture 258 fluidly coupled to a source of heated engine cooling fluid 211 (in this case the cylinder head 74). The second member 234 defines a first chamber second aperture 260 fluidly coupled to a cooling chamber 262. The coolant reservoir first member 232 defines the second chamber second aperture 256 fluidly coupled to the cooling chamber 262 configured to receive cooled fluid from the cooling chamber 262.

Disposed between the second and third chambers 206 and 205 is a conical swirl plate member 264. The conical swirl plate member 264 defines a plurality of coupling apertures 266 fluidly coupling the second and third chambers 206 and 205. These apertures 266 are configured to allow trapped gasses within the cooling system to escape from the second chamber 206 into the third chamber 205 as well as to allow coolant poured into the third chamber 205 through the closable filling port 242 to flow down into the second and third chambers 204 and 206 where it is incorporated into the cooling system.

Figure 8A:
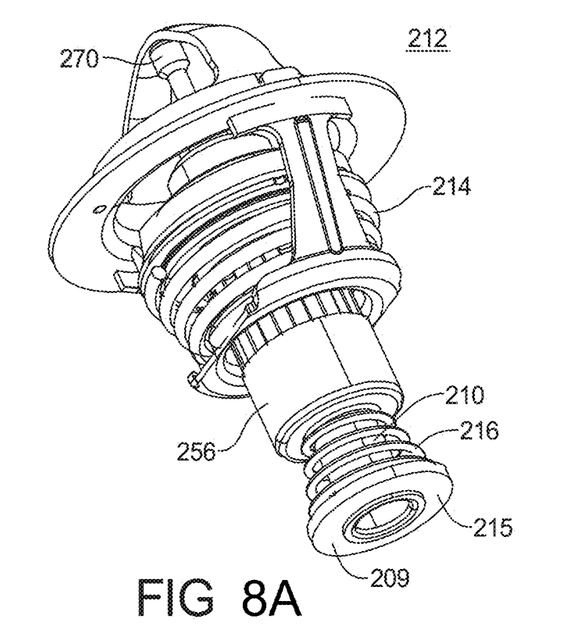
FIGS. 8A and 8B are perspective views of a thermally activated valve according to the present teachings.
Figure 8B:
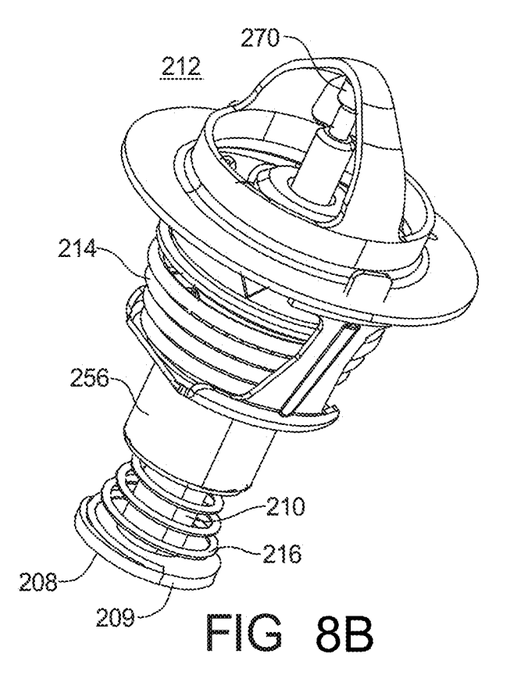

FIGS. 8A and 8B is a perspective view of the thermally responsive actuator 212 according to the present teachings. The thermally responsive actuator 212 is configured to retract the piston 270 and thereby position the valve seat member 209 away from the valve seat 208 when the thermally responsive actuator 212 is exposed to fluid temperatures below a predetermined value, in an open position (see FIG. 7A above). The first and second springs 214 and 216 function to pull the thermally responsive actuator 212 way from the valve seat 208, when the piston 270 is retracted. Similarly, the thermally responsive actuator 212 is configured to expel the piston 270 and thereby position the valve seat member 209 on the valve seat 208 when the thermally responsive actuator 212 is exposed to fluid temperatures above a predetermined value, in a closed position (see FIG. 7B above). The sliding valve element 210 bearing surface slidably supports the valve seat member 209 and regulates the movement of the valve seat member 209 toward and away from the valve seat 208.

Figure 9:
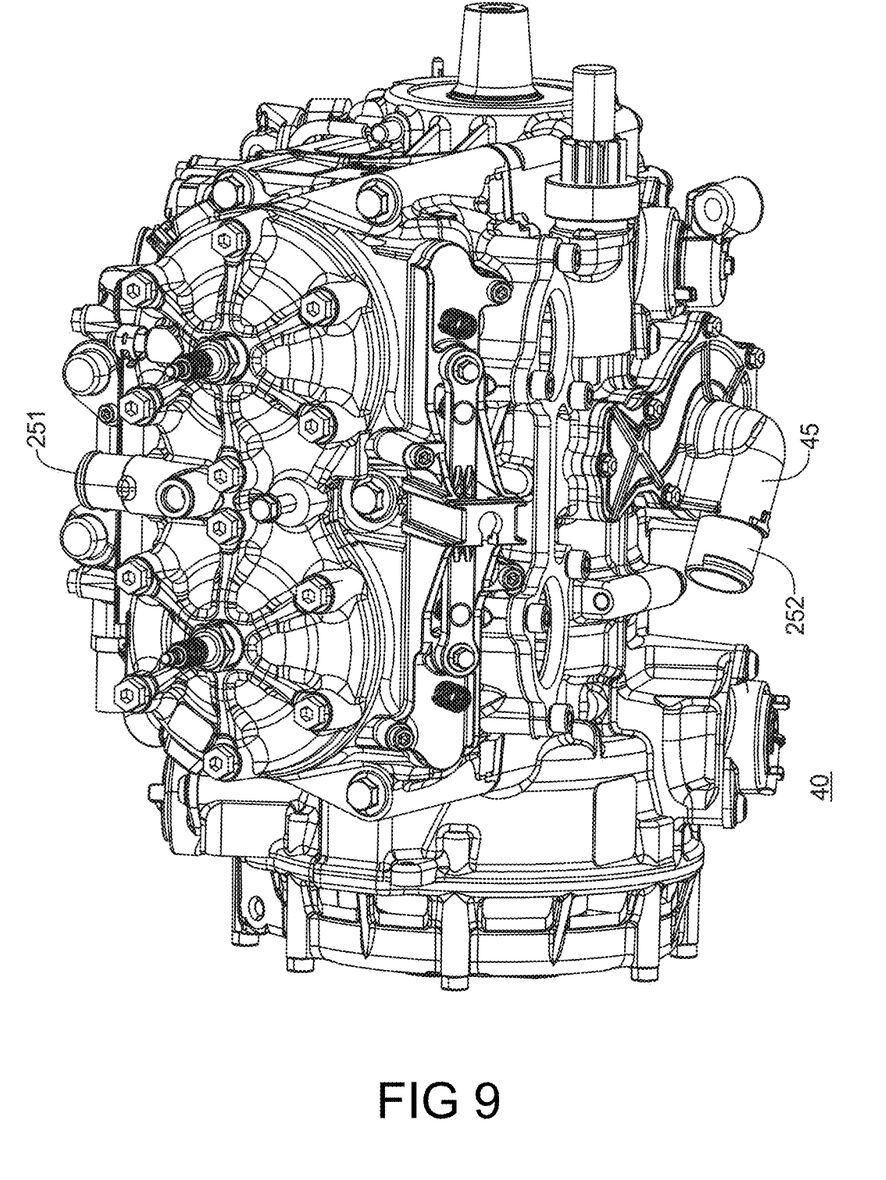
FIG. 9 is a perspective view of an engine having improved cooling fluid flow according to the present teachings.
Figure 10A:
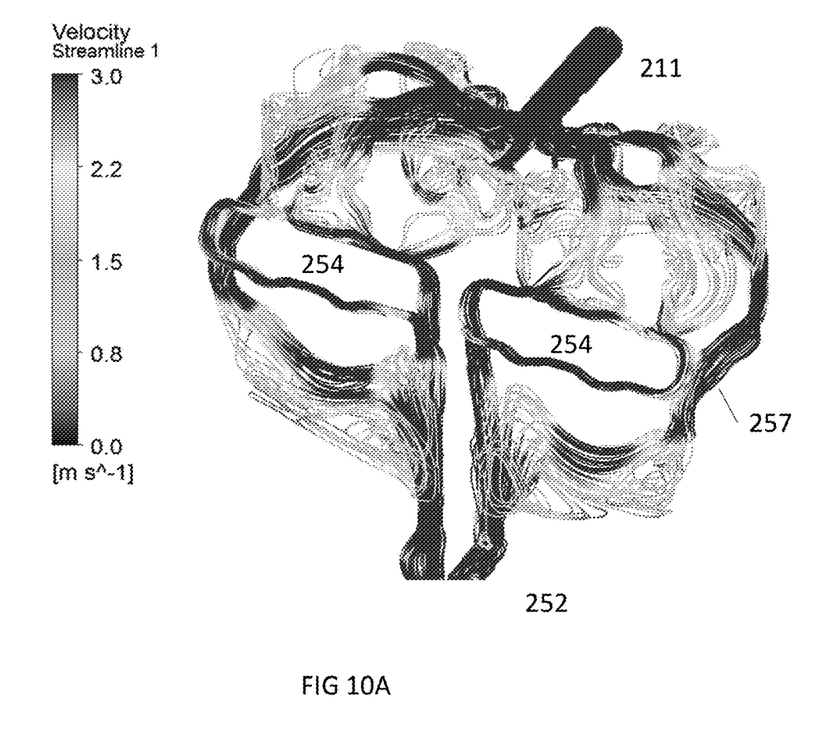
FIGS. 10A and 10B represent front and rear views of the flow of cooling fluid through an engine according to the present teachings.
Figure 10B:
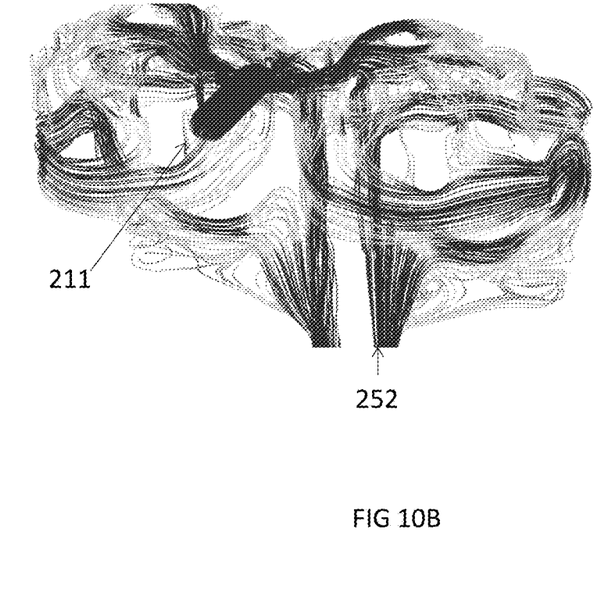
Figure 10C:
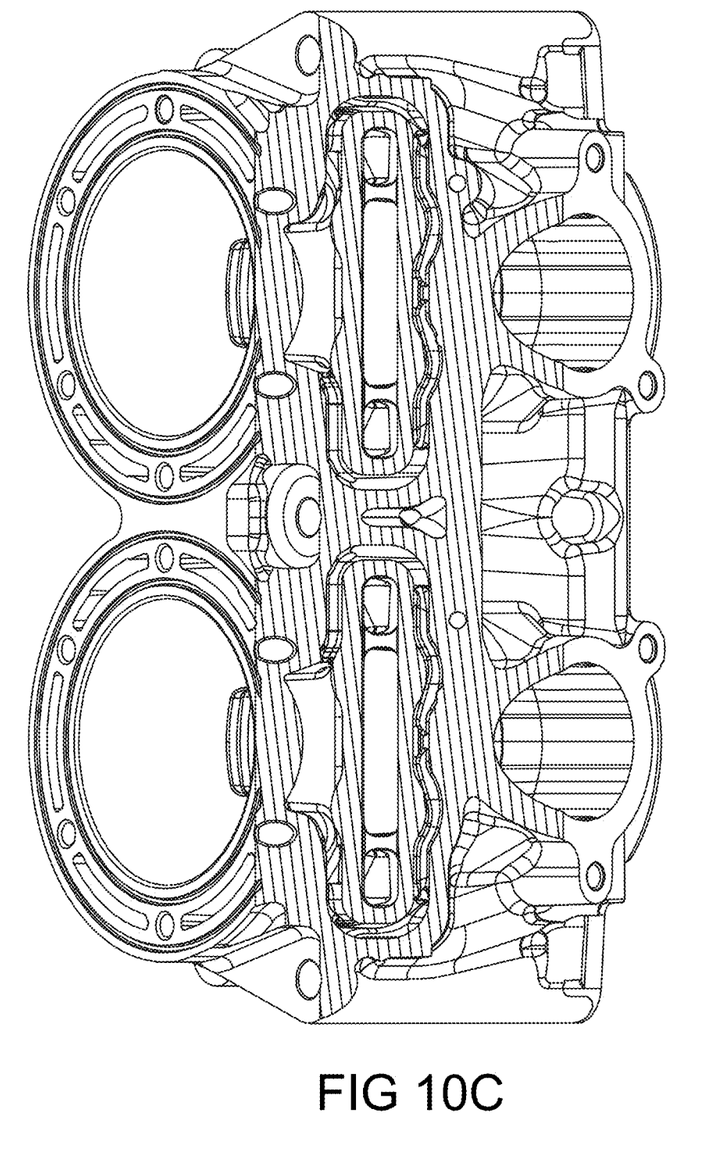
FIG. 10C represents a sectional view of the crankcase through the exhaust port valves.

FIG. 9 is a perspective view of the engine 40 having improved cooling fluid flow according to the present teachings. FIGS. 10A and 10B represent front and rear views of the flow of cooling fluid through the engine shown in FIG. 9. FIG. 10c represents a sectional view of the crank case through the exhaust valves. As can be seen, the cooling routs surround the oval aperture of the exhaust valve inlet to take excess heat way from this very susceptible component. These represent flow areas 254 as shown in FIG. 10A.

Figure 11:
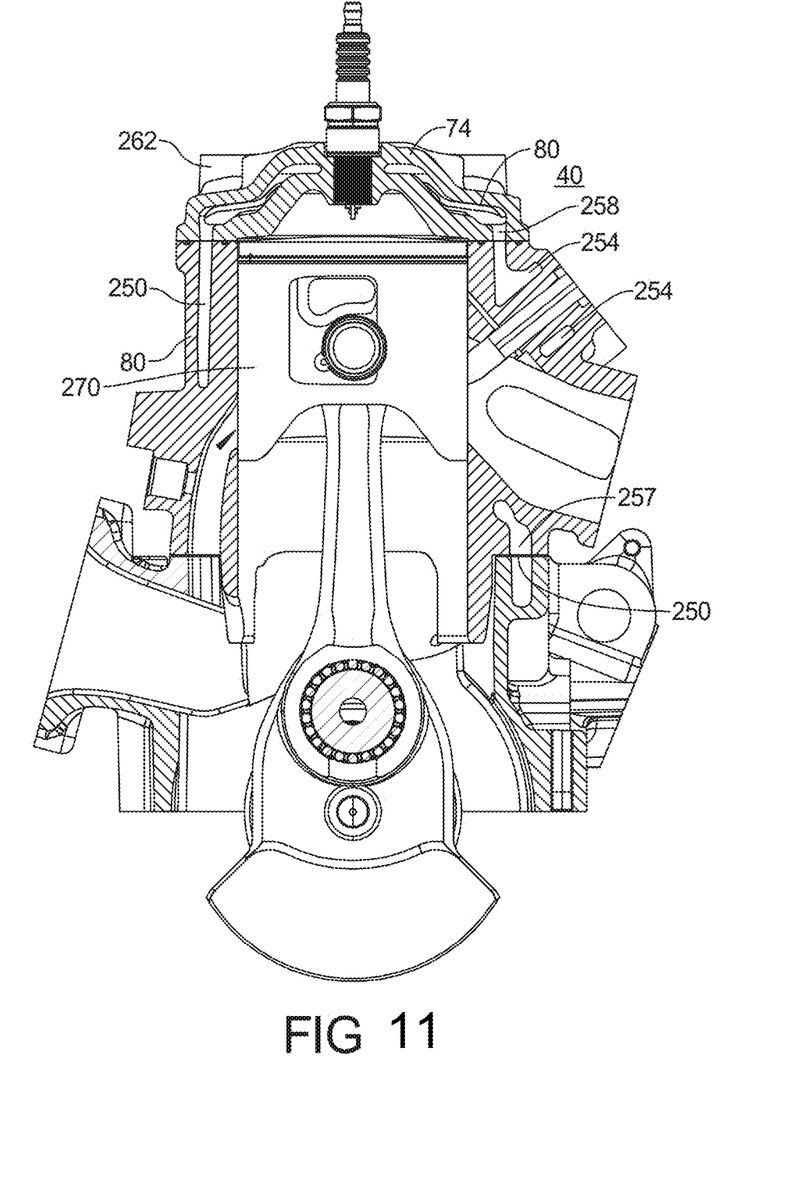
FIG. 11 is a side cross sectional view of the engine show in FIG. 9.

FIG. 11 is a cross sectional view of engine showing the cooling apertures within the engine show in FIG. 9. With reference to these figures, the engine assembly 40 having the engine block 80 and cylinder head 74 define interior cooling chambers 250 which accept flowing cooling fluid. The velocity of the fluid at the entrance into the engine is greater than 2.1 m/s and preferably between 2.1 and 3.0 m/s. Fluid velocities for a second series of passages 254 annularly disposed about the exhaust port 256 are most preferably greater than 2.4 m/s and preferable remain between 2.1 and 3 m/s. Temperatures for the cooled regions can be between 275 degrees F. and 350 degrees F.

As shown, cooling fluid from the bottle 202 passes through the water pump 49 and into a first portion of the engine block at 252. As this high velocity cooled fluid enters the engine block 80, a first portion of the flow passes directly into the second series of passages 254 annularly disposed about the exhaust port 256 which is coupled to the exhaust assembly 44. After cooling the engine components adjacent to the exhaust portion 256 this portion of the fluid flows into the cylinder head 74. A second portion 258 of the flow passes directly into a third series of passages 260 annularly disposed about the cylinders and pistons 76. After cooling the engine components adjacent to the cylinders this portion of the fluid flows into the cylinder head 74 and combines with the first portion of the fluid flow. This heated combined fluid flow exits the cylinder head 74, and becomes the source of heated engine cooling fluid 211.

Examples are provided so that this disclosure will be thorough, and will fully convey the scope to those who are skilled in the art. Numerous specific details are set forth such as examples of specific components, devices, and methods, to provide a thorough understanding of examples of the present disclosure. It will be apparent to those skilled in the art that specific details need not be employed, that examples may be embodied in many different forms and that neither should be construed to limit the scope of the disclosure. In some examples, well-known processes, well-known device structures, and well-known technologies are not described in detail.

The foregoing description has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A coolant reservoir bottle configured to be placed within a vehicle cooling system, the coolant reservoir bottle comprising:
    the coolant bottle defining a first chamber fluidly coupled to a second chamber through an aperture, the aperture having a valve seat, the first chamber being fluidly coupled to a source of heated engine cooling fluid, said second chamber being fluidly coupled to an engine water pump;
    a thermally responsive actuator disposed within the first chamber having a thermally actuated sliding member with a valve seat engaging surface, the thermally actuated sliding member having first and second intermediate helical springs annularly disposed about the thermally actuated sliding member and being movable from a first open position when a coolant is below a first temperature to a second position where the valve seat engaging surface is disposed against the valve seat when the coolant is above the first temperature.

2. The coolant reservoir of claim 1 further comprising a first member defining a first portion of the first chamber and a first portion of the second chamber.

3. The coolant reservoir of claim 2 further comprising a second member defining a second portion of the first chamber, and wherein the thermally responsive actuator has a flange member.

4. The coolant reservoir of claim 2 further comprising a first member defining a first portion of the first chamber and a first portion of the second chamber.

5. The coolant reservoir of claim 2 where said first member defines a first chamber first aperture fluidly coupled to the engine water pump.

6. The coolant reservoir of claim 2 where said first member defines a first chamber first aperture fluidly coupled to the source of heated engine cooling fluid.

7. The coolant reservoir of claim 1 wherein first member defines a bypass aperture between the first and second chambers having the valve seat, whereby said valve seat engaging surface is positioned adjacent said bypass aperture.

8. The coolant reservoir of claim 1 wherein said thermally responsive actuator is coupled to the coolant bottle.

9. The coolant reservoir of claim 2 where said first member defines a first chamber second aperture fluidly coupled to a cooling chamber.

10. The coolant reservoir of claim 2 where said second member defines a first chamber second aperture fluidly coupled to the cooling chamber.

11. A coolant reservoir bottle configured to be placed within a vehicle cooling system, the coolant reservoir bottle comprising:
the coolant bottle formed of first and second members, said first and second members defining a first chamber, said first member further forming a portion of a second chamber, said first chamber and second chamber being fluidly coupled through an aperture having a valve seat, said first chamber being configured to be fluidly coupled to a source of heated engine cooling fluid, said second chamber being fluidly coupled to an engine water pump;
a thermally responsive actuator disposed within the first chamber, having a thermally actuated sliding member having a valve seat engaging surface, the thermally actuated sliding member being movable from a first open position when a coolant is below a first temperature to a second position closed position where the valve seat engaging surface is disposed against the valve seat when the coolant is above the first temperature.

12. The coolant reservoir bottle of claim 11 where said first member defines a second chamber first aperture fluidly coupled to the engine water pump.

13. The coolant reservoir bottle of claim 12 where said first member further defines a second chamber first aperture fluidly coupled to the source of heated engine cooling fluid.

14. The coolant reservoir bottle of claim 13 wherein said first member defines a second chamber second aperture fluidly coupled to a heat exchange chamber.

15. The coolant reservoir of claim 14 where said second member defines a first chamber second aperture fluidly coupled to the heat exchange chamber.

16. A vehicle engine comprising:
an engine head defining a fluid accepting cooling passage; and
an engine block fluidly coupled to the engine head, said engine block defining a combustion chamber and exhaust ports and a cooling path which branches into a first path and a second path;
wherein the first path surrounds the exhaust ports and the second path surrounds the combustion chamber;
wherein the first path passes a cooling fluid into the engine head after passing the exhaust ports;
a coolant bottle defining a first chamber fluidly coupled to a second chamber through an aperture, the aperture having a valve seat; and
a thermally responsive actuator disposed within the first chamber having a thermally actuated sliding member with a valve seat engaging surface;
wherein the first chamber is operable to be fluidly coupled to a source of heated engine cooling fluid;
wherein the second chamber is operable to be fluidly coupled to an engine water pump;
wherein the thermally actuated sliding member has first and second intermediate helical springs annularly disposed about the thermally actuated sliding member, wherein the thermally actuated sliding member is operable to be movable from a first open position when a coolant is below a first temperature to a second position where the valve seat engaging surface is disposed against the valve seat when the coolant is above the first temperature.

17. The vehicle engine according to claim 16 wherein the second path passes cooling fluid into the engine head after passing the combustion chamber.

18. The vehicle engine according to claim 16 wherein the cooling path passes the cooling fluid out of the engine head into the cooling system.

19. The vehicle engine according to claim 16 wherein the fluid passing through the first path represents 40% to 60% of the coolant flow.

20. The vehicle engine according to claim 16 wherein the fluid has a fluid velocity of between 2.1 and 3.0 m/s when the fluid is passing the exhaust ports.

* * * * *